United States Patent
Kedir et al.

(10) Patent No.: US 9,755,212 B2
(45) Date of Patent: Sep. 5, 2017

(54) TRACTION BATTERY BUSBAR CARRIERS FOR POUCH BATTERY CELLS

(71) Applicant: Ford Global Technologies, LLC, Dearborn, MI (US)

(72) Inventors: Temam Kedir, Ann Arbor, MI (US); Steven Droste, Ypsilanti, MI (US); Debbi Callicoat, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 369 days.

(21) Appl. No.: 14/538,341

(22) Filed: Nov. 11, 2014

(65) Prior Publication Data

US 2016/0133906 A1    May 12, 2016

(51) Int. Cl.
*H01M 2/20* (2006.01)
*H01M 2/10* (2006.01)
*H01M 10/48* (2006.01)
*B60L 11/18* (2006.01)

(52) U.S. Cl.
CPC ............. *H01M 2/206* (2013.01); *B60L 11/18* (2013.01); *H01M 2/1077* (2013.01); *H01M 10/48* (2013.01); *H01M 10/486* (2013.01); *H01M 2220/20* (2013.01)

(58) Field of Classification Search
CPC .............. H01M 10/48; H01M 10/486; H01M 2220/20; H01M 2/1077; H01M 2/206
See application file for complete search history.

(56) References Cited

U.S. PATENT DOCUMENTS

| | | |
|---|---|---|
| 4,845,589 A | 7/1989 | Weidler et al. |
| 6,275,003 B1 | 8/2001 | Marukawa et al. |
| 8,235,732 B2 | 8/2012 | Garascia et al. |
| 2006/0145657 A1 | 7/2006 | Hashida et al. |
| 2010/0248008 A1 | 9/2010 | Sugawara et al. |
| 2011/0104556 A1 | 5/2011 | Kim et al. |
| 2013/0196195 A1 | 8/2013 | Nguyen et al. |
| 2015/0037634 A1* | 2/2015 | Malcolm ............ H01M 10/482 429/90 |

\* cited by examiner

*Primary Examiner* — Basia Ridley
*Assistant Examiner* — Heng Chan
(74) *Attorney, Agent, or Firm* — David B. Kelley; Brooks Kushman P.C.

(57) ABSTRACT

A vehicle including an array of pouch battery cells, a pair of carriers, and a plurality of busbars is provided. The array of pouch battery cells may each have terminal tabs of opposite polarity extending from opposing cell faces. The pair of carriers may extend along the cell faces and each may define a plurality of apertures sized to receive the terminal tabs. The plurality of busbars may be arranged with the carriers and terminal tabs such that an electrical connection across the cells includes parallel and series connections. The pouch battery cells may be arranged in clusters of adjacent cells connected in parallel, and the busbars may be arranged in spaced apart groups on each of the carriers and joined to adjacent terminal tabs to connect the clusters in series.

18 Claims, 3 Drawing Sheets

TRACTION BATTERY BUSBAR CARRIERS FOR POUCH BATTERY CELLS

TECHNICAL FIELD

This disclosure relates to support structures for high voltage batteries utilized in vehicles.

BACKGROUND

Vehicles such as battery-electric vehicles (BEVs), plug-in hybrid-electric vehicles (PHEVs), mild hybrid-electric vehicles (MHEVs), or full hybrid-electric vehicles (FHEVs) contain an energy storage device, such as a high voltage (HV) battery, to act as a propulsion source for the vehicle. The HV battery may include components and systems to assist in managing vehicle performance and operations. The HV battery may also include one or more arrays of battery cells interconnected electrically between battery cell terminals and interconnector busbars. The HV battery and surrounding environment may include a thermal management system to assist in managing temperature of the HV battery components, systems, and individual battery cells. The thermal management system may include a thermal plate to facilitate coolant flow proximate the battery cells to assist in managing thermal conditions of the battery cells.

SUMMARY

A traction battery assembly includes an array of pouch battery cells, a pair of laddered carriers, a pair of endplates, and first and second groups of spaced apart busbars. Each of the pouch battery cells have terminal tabs extending from opposing side faces of the cells. The pair of laddered carriers each extends along opposite sides of the array and is configured for the terminal tabs to extend therethrough. The pair of endplates is secured to and arranged with the carriers to retain the array therebetween. The first and second groupings of spaced apart busbars are each secured to one of the carriers such that the groupings are offset from one another and arranged with adjacent terminal tabs to conductively connect the pouch battery cells in series. At least one of the laddered carriers may include a terminal post conductively connected to at least one of the first and second groupings of spaced apart busbars. The terminal post may be configured to electrically connect with another array of pouch battery cells. The array may include an odd number of pouch battery cells. Each of the pair of laddered carriers may include a terminal post at opposite ends of the array configured to electrically connect the array to another array of pouch battery cells. The array may include an even number of pouch battery cells, and one of the pair of laddered carriers may include two terminal posts at opposite ends of the array to electrically connect the array to another array of pouch battery cells. Clusters of adjacent pouch battery cells may be arranged in parallel, and the first and second groupings of spaced apart busbars may be arranged with the terminal tabs of the clusters to electrically connect the clusters in series. Each of the pair of laddered carriers may define apertures spaced apart from one another and configured to orient the terminal tabs with the respective first and second groupings of spaced apart busbars. One or more sense wires may be electrically connected with the pouch battery cells and configured to measure temperature, voltage, or current conditions of the array. Each of the busbars may be electrically connected to at least two terminal tabs of opposite polarity or a terminal post.

A vehicle includes an array of pouch battery cells, a pair of carriers, and a plurality of busbars. Each of the pouch battery cells have terminal tabs of opposite polarity extending from opposing cell faces. The pair of carriers extends along the cell faces and each defines a plurality of apertures sized to receive the terminal tabs. The plurality of busbars is arranged with the carriers and terminal tabs such that an electrical connection across the cells includes parallel and series connections. The pouch battery cells may be arranged in clusters of adjacent cells connected in parallel, and the busbars may be arranged in spaced apart groups on each of the carriers and joined to adjacent terminal tabs to connect the clusters in series. One of the pair of carriers may include a terminal post at either end of the carrier conductively connected to the clusters of adjacent cells and configured to conductively connect to another array of battery cells. Each of the carriers may include a terminal post at opposite ends of the array conductively connected to the clusters of adjacent cells and configured to conductively connect to another array of battery cells. Each of the busbars may define a tab aperture to receive the terminal tab, and the tab aperture may be in registration with one of the apertures of the respective carrier. The pair of carriers may be further arranged with the terminal tabs to provide clearance for laser welding of adjacent terminal tabs and busbars.

A traction battery assembly includes an array of pouch battery cells, a pair of laddered carriers, and a plurality of busbars. The array of pouch battery cells has terminal tabs extending from opposite side faces of the cells. The pair of laddered carriers extends along opposite sides of the array and each is configured to retain the terminal tabs. The plurality of busbars is secured to the carriers in an offset configuration relative to one another, and is configured to electrically connect parallel clusters of the cells in series to other parallel clusters of the cells. The pair of laddered carriers may each include a terminal post conductively connected to the busbars and configured to electrically connect to another array of pouch battery cells. One of the pair of laddered carriers may include a terminal post conductively connected to the busbars and configured to electrically connect to another array of pouch battery cells. One or more sense wires may be electrically connected with the pouch battery cells and configured to measure temperature, voltage, and current conditions of the array. Each of the busbars may define at least one aperture to receive one of the terminal tabs, and the aperture may be in substantial registration with a carrier aperture defined by one of the laddered carriers. A pair of endplates may be secured to the carriers at opposite ends of the array, and the endplates and carriers may be configured to be secured to a support structure of another array.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ embodiments of the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
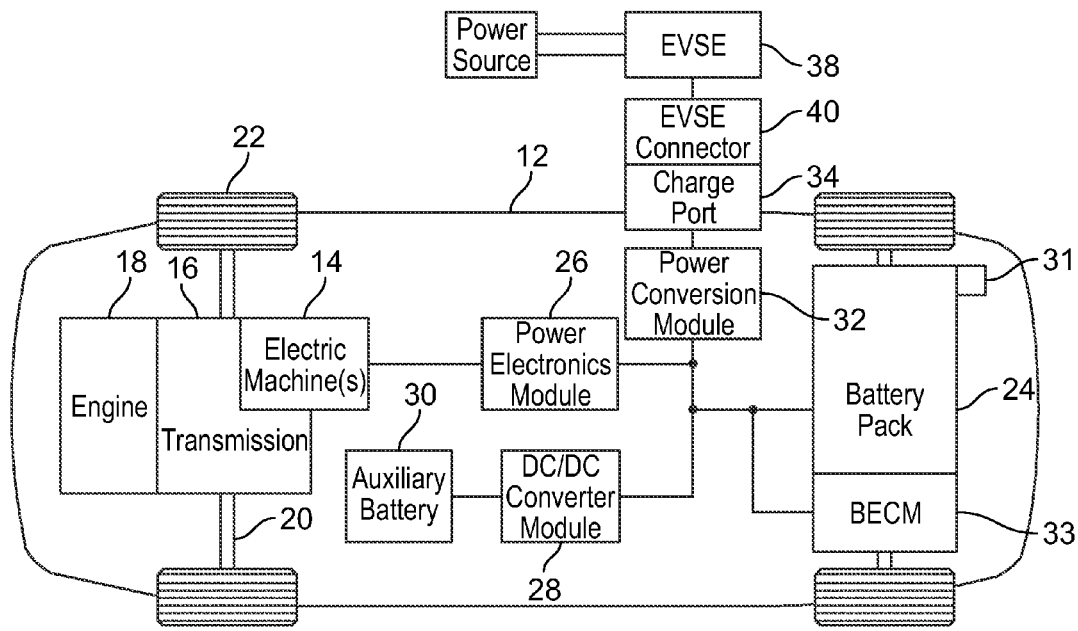
FIG. 1 is a schematic illustrating a battery electric vehicle.

FIG. 1 depicts a schematic of a typical plug-in hybrid-electric vehicle (PHEV). A typical plug-in hybrid-electric vehicle 12 may comprise one or more electric machines 14 mechanically connected to a hybrid transmission 16. The electric machines 14 may be capable of operating as a motor or a generator. In addition, the hybrid transmission 16 is mechanically connected to an engine 18. The hybrid transmission 16 is also mechanically connected to a drive shaft 20 that is mechanically connected to the wheels 22. The electric machines 14 can provide propulsion and deceleration capability when the engine 18 is turned on or off. The electric machines 14 also act as generators and can provide fuel economy benefits by recovering energy that would normally be lost as heat in the friction braking system. The electric machines 14 may also provide reduced pollutant emissions since the hybrid-electric vehicle 12 may be operated in electric mode or hybrid mode under certain conditions to reduce overall fuel consumption of the vehicle 12.

A traction battery or battery pack 24 stores and provides energy that can be used by the electric machines 14. The traction battery 24 typically provides a high voltage DC output from one or more battery cell arrays, sometimes referred to as battery cell stacks, within the traction battery 24. The battery cell arrays may include one or more battery cells. The traction battery 24 is electrically connected to one or more power electronics modules 26 through one or more contactors (not shown). The one or more contactors isolate the traction battery 24 from other components when opened and connect the traction battery 24 to other components when closed. The power electronics module 26 is also electrically connected to the electric machines 14 and provides the ability to bi-directionally transfer electrical energy between the traction battery 24 and the electric machines 14. For example, a typical traction battery 24 may provide a DC voltage while the electric machines 14 may require a three-phase AC voltage to function. The power electronics module 26 may convert the DC voltage to a three-phase AC voltage as required by the electric machines 14. In a regenerative mode, the power electronics module 26 may convert the three-phase AC voltage from the electric machines 14 acting as generators to the DC voltage required by the traction battery 24. The description herein is equally applicable to a pure electric vehicle. For a pure electric vehicle, the hybrid transmission 16 may be a gear box connected to an electric machine 14 and the engine 18 may not be present.

In addition to providing energy for propulsion, the traction battery 24 may provide energy for other vehicle electrical systems. A typical system may include a DC/DC converter module 28 that converts the high voltage DC output of the traction battery 24 to a low voltage DC supply that is compatible with other vehicle loads. Other high-voltage loads, such as compressors and electric heaters, may be connected directly to the high-voltage without the use of a DC/DC converter module 28. In a typical vehicle, the low-voltage systems are electrically connected to an auxiliary battery 30 (e.g., 12V battery).

A battery electrical control module (BECM) 33 may be in communication with the traction battery 24. The BECM 33 may act as a controller for the traction battery 24 and may also include an electronic monitoring system that manages temperature and charge state of each of the battery cells. The traction battery 24 may have a temperature sensor 31 such as a thermistor or other temperature gauge. The temperature sensor 31 may be in communication with the BECM 33 to provide temperature data regarding the traction battery 24. The temperature sensor 31 may also be located on or near the battery cells within the traction battery 24. It is also contemplated that more than one temperature sensor 31 may be used to monitor temperature of the battery cells.

The vehicle 12 may be, for example, an electric vehicle such as a PHEV, a FHEV, a MHEV, or a BEV in which the traction battery 24 may be recharged by an external power source 36. The external power source 36 may be a connection to an electrical outlet. The external power source 36 may be electrically connected to electric vehicle supply equipment (EVSE) 38. The EVSE 38 may provide circuitry and controls to regulate and manage the transfer of electrical energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34.

The various components discussed may have one or more associated controllers to control and monitor the operation of the components. The controllers may communicate via a serial bus (e.g., Controller Area Network (CAN)) or via discrete conductors.

The battery cells, such as a prismatic cell, may include electrochemical cells that convert stored chemical energy to electrical energy. Prismatic cells may include a housing, a positive electrode (cathode) and a negative electrode (anode). An electrolyte may allow ions to move between the anode and cathode during discharge, and then return during recharge. Terminals may allow current to flow out of the cell for use by the vehicle. When positioned in an array with multiple battery cells, the terminals of each battery cell may be aligned with opposing terminals (positive and negative) adjacent to one another and a busbar may assist in facilitating a series connection between the multiple battery cells.

The battery cells may also be arranged in parallel such that similar terminals (positive and positive or negative and negative) are adjacent to one another. For example, two battery cells may be arranged with positive terminals adjacent to one another, and the next two cells may be arranged with negative terminals adjacent to one another. In this example, the busbar may contact terminals of all four cells. The traction battery 24 may be heated and/or cooled using a liquid thermal management system, an air thermal management system, or other method as known in the art.

Figure 2:
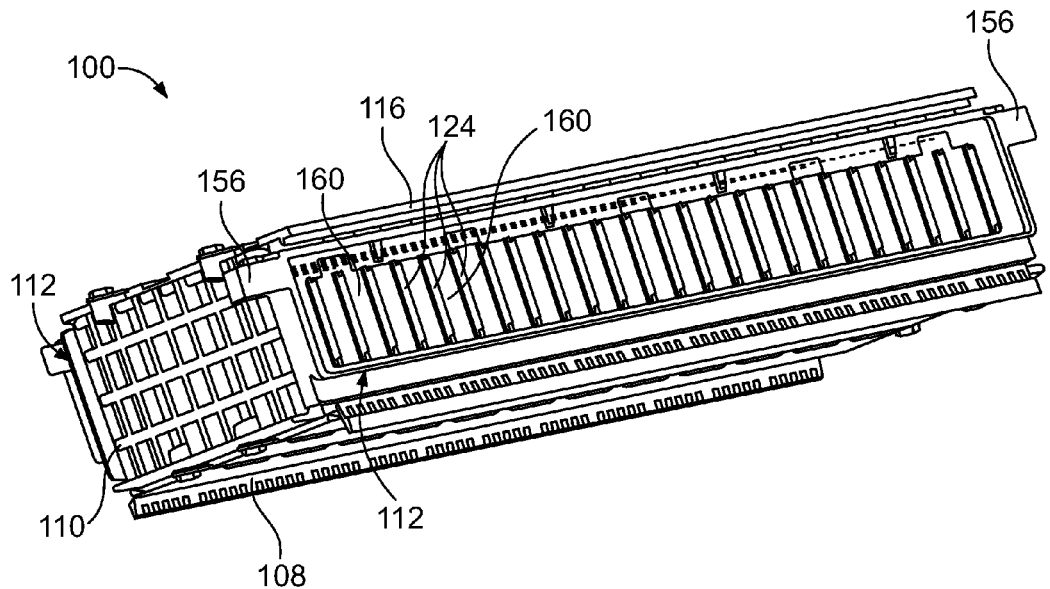
FIG. 2 is a perspective view of an example of a portion of a traction battery.
Figure 3A:
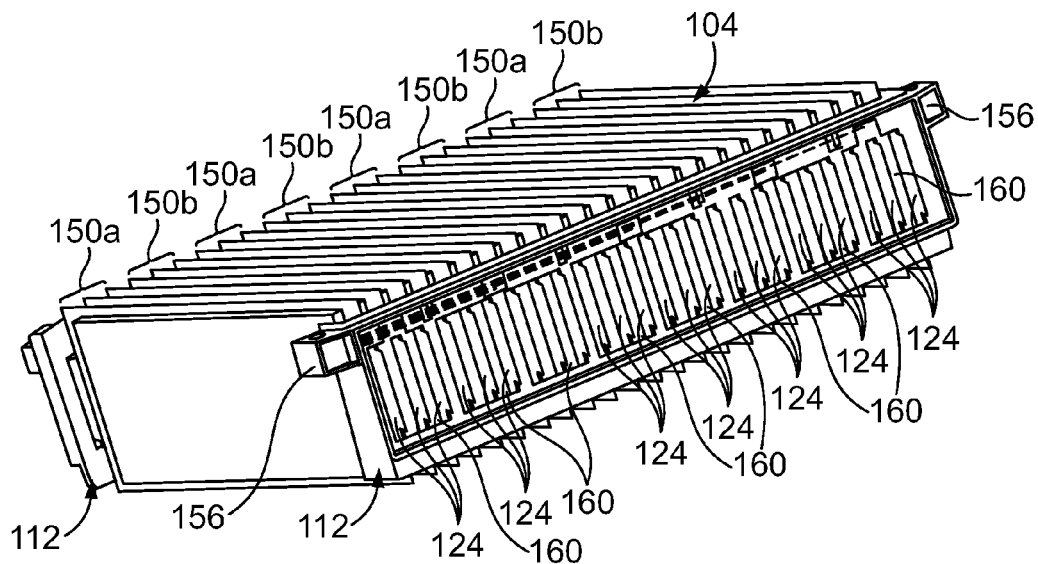
FIG. 3A is a perspective view of a pouch battery cell array retained between a pair of carriers.
Figure 3B:
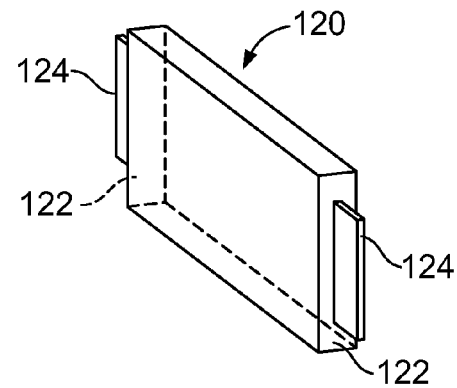
FIG. 3B is a perspective view of a pouch battery cell of the pouch battery cell array of FIG. 3A.

In comparison to prismatic cells, pouch battery cells may require different types of supporting structures to provide electrical connections within a pouch battery cell array. For example, FIG. 2 shows an example of a portion of a traction battery generally referred to as traction battery 100 herein. The traction battery 100 may include an exo-support structure to retain a pouch battery cell array 104 therein. The exo-support structure may include a tray 108, a pair of endplates 110, a pair of carriers 112, and a cover 116. The pouch battery cell array 104 may include a plurality of pouch battery cells 120 as shown in FIG. 3A. Each of the pouch battery cells 120 may include a pair of outer side faces 122 as further shown in FIG. 3B. Each of the pouch battery cells 120 may include two terminal tabs 124 having opposite polarity. For each of the pouch battery cells 120, one of the terminal tabs 124 having a positive polarity extends from one of the outer side faces 122, and the other of the terminal tabs 124 having a negative polarity extends from the other of the outer side faces 122.

The traction battery 100 may include clusters of adjacent pouch battery cells 120. For example, FIG. 3A shows the pouch battery cell array 104 having multiple clusters of adjacent pouch battery cells 120, such as cell clusters 150a and cell clusters 150b which may be referred to collectively as cell clusters 150 herein. Each of the cell clusters 150 may include three pouch battery cells 120 in this example, though it is contemplated that other examples of cell clusters 150 may include fewer or more than three pouch battery cells 120. The carriers 112 may assist in retaining the pouch battery cells 120 therebetween. For example, the carriers 112 may extend along opposite sides of the pouch battery cell array 104. The carriers 112 may be secured to the tray 108, the pair of endplates 110, and the cover 116. The carriers 112 may each define a plurality of apertures 155 sized to receive the terminal tabs 124. The apertures 155 may be spaced apart along the carriers 112 to define a laddered shape of the carriers 112. Each of the carriers 112 may include a terminal post 156. The terminal post 156 may assist in transferring energy from the pouch battery cell array 104 to another vehicle component, such as another array of pouch battery cells, a service disconnect, an electric machine, a relay, or a battery electrical conductor.

Figure 4:
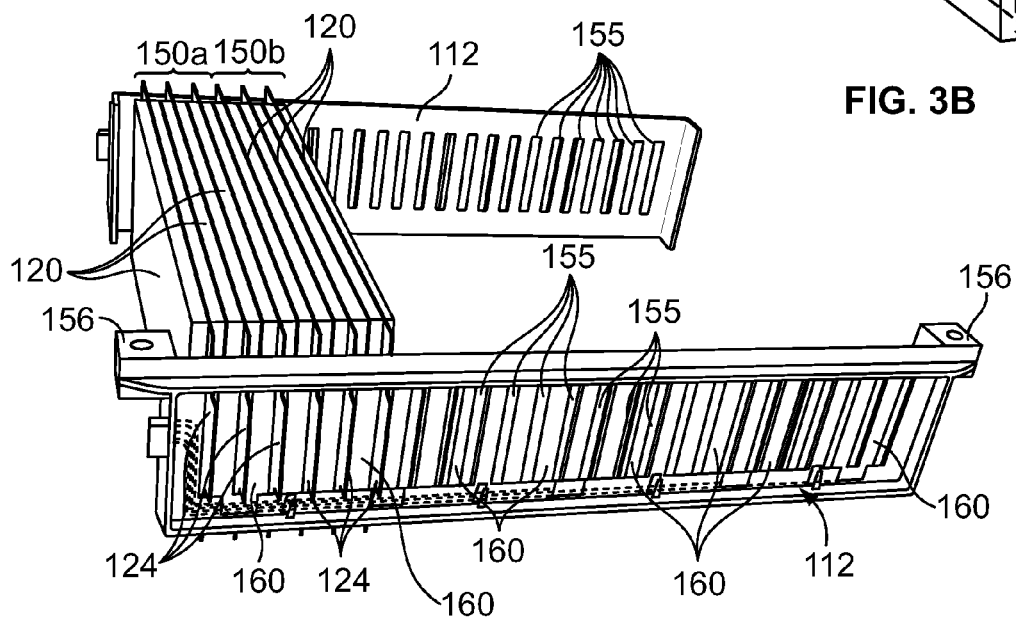
FIG. 4 is a perspective view of two clusters of battery cells of the pouch battery cell array arranged with the pair of carriers.
Figure 5:
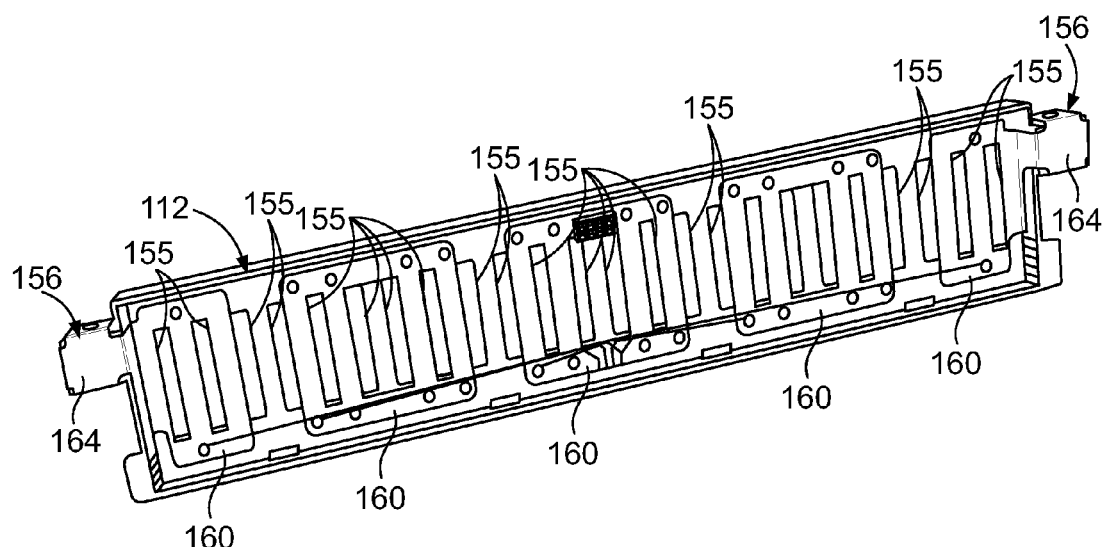
FIG. 5 is a perspective view of one of the pair of carriers shown with a series of busbars mounted thereto.

For example, FIGS. 3A, 4, and 5 further show the carriers 112 having the laddered configuration. A series of busbars 160 may be secured to an inner side of each of the carriers 112. Each of the busbars 160 may define busbar apertures sized to receive the terminal tabs 124. In this example, five busbars 160 are used, however it is contemplated the more or fewer may be utilized with other examples of traction batteries according to a number of battery cells. The busbars 160 may be sized and oriented with adjacent terminal tabs 124 to facilitate a conductive connection therebetween. The traction battery 100 may include a first and a second grouping of the busbars 160. Each of the groupings may be secured to one of the carriers 112 such that the first grouping and the second grouping are offset relative to one another and arranged with adjacent terminal tabs 124 to conductively connect the pouch battery cells 120 in series. The busbars 160 which are located at opposite ends of the carriers 112 may include a terminal post flange 164. The terminal post flanges 164 may be arranged with the terminal posts 156 to assist in conductively connecting the pouch battery cell array 104 to the other vehicle components such as another pouch battery cell array.

Figure 6:
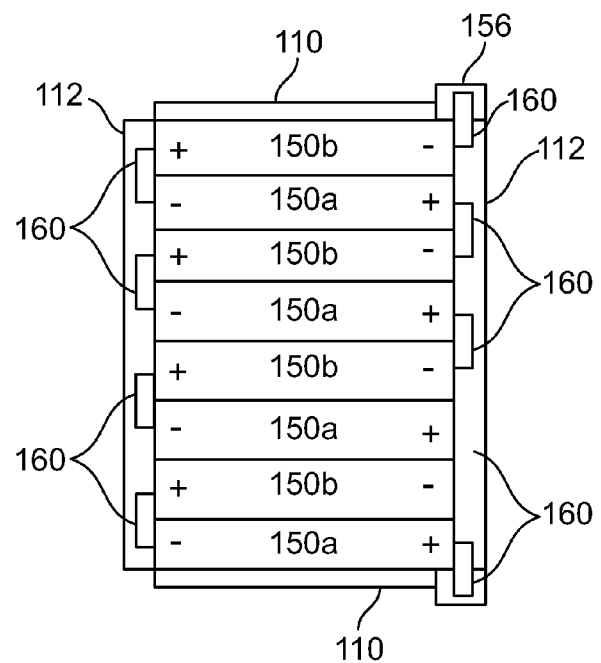
FIG. 6 is a plan view of the pouch battery cell array retained between the pair of carriers and a pair of endplates.

The pouch battery cells 120 of each cell cluster 150 may be arranged with the carriers 112 and the busbars 160 to facilitate a parallel electrical connection and a series electrical connection as further shown in FIG. 6. For example, busbars 160 of opposite carriers 112 may be offset from one another to facilitate the parallel and series electrical connections across the pouch battery cell array 104. FIG. 6 shows a plan view of an example of the parallel electrical connection within each of the cell clusters 150 and the series electrical connection across the cell clusters 150. The pouch battery cells 120 may be oriented within the respective cell cluster 150a or 150b such that terminal tabs 124 of the same polarity are adjacent to one another. The terminal tabs 124 of each respective cell cluster 150 may be welded to the respective busbar 160. As mentioned above, the busbars 160 of opposite carriers 112 may be offset to facilitate a series electrical connection of the cell clusters 150. In this example, the terminal posts 156 are both included on one of the carriers 112 since there are an even number of cell clusters 150, however it is contemplated that the terminal posts 156 may be on different carriers 112 under certain conditions, such as a pouch battery cell array which includes an odd number of cell clusters 150.

Sensors may be included proximate the pouch battery cells 120 to monitor conditions thereof. For example, one or more sense wires 168 may be secured to each of the carriers 112 and conductively connected to the pouch battery cells 120 and/or the busbars 160. In another example, trace wires may be conductively connected to the pouch battery cells 120 and/or the busbars 160. The sense wires 168 may measure conditions of the pouch battery cell array 104 such as temperature, current, and voltage. The sense wires 168 may be in electrical communication with a controller, such as a BECM (not shown), to provide the controller with the measured conditions of the pouch battery cell array 104.

As described above, the carriers 112 may be arranged with the busbars 160 to assist in orienting the pouch battery cells 120 in both parallel and series. This arrangement provides advantages for drawing energy from the pouch battery cell array 104 to use within a vehicle. For example, the parallel connection of the pouch battery cells 120 may provide increased current across the pouch battery cell array 104 such that energy output of the pouch battery cells 120 is increased. As another example, the series connection of the pouch battery cells 120 may provide increased voltage across the pouch battery cell array 104 such that the energy output of the pouch battery cells 120 is increased. Additionally, the arrangement may also provide advantages relating to assembly and installation of the traction battery 100. For example, the busbars 160 may define a substantially flat profile which may assist with stumping the busbars 160 and accommodating laser welding during installation. As another example, the terminal post flanges 164 may be molded to the carriers 112 to accommodate packaging constraints. In yet another example and as mentioned above, the terminal posts 156 may assist in conductively connecting the pouch battery cell array 104 with other pouch battery cell arrays to provide traction battery configurations which may draw energy from multiple sources.

While various embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to marketability, appearance, consistency, robustness, customer acceptability, reliability, accuracy, etc. As such, embodiments described as less desirable than other embodiments or prior art implementations with respect to one or more characteristics are not outside the scope of the disclosure and can be desirable for particular applications.

What is claimed is:

1. A traction battery assembly comprising:
   an array of pouch battery cells each having terminal tabs extending from opposing side faces of the cells;
   a pair of laddered carriers each extending along opposite array sides, each defining rectangular-shaped ladder apertures for the terminal tabs to extend through, and each oriented perpendicularly relative to an underlying battery tray;
   a pair of endplates secured to and arranged with the carriers to retain the array therebetween; and
   first and second groupings of spaced apart busbars each secured to one of the carriers such that the groupings are offset from one another and arranged with adjacent terminal tabs to conductively connect the pouch battery cells in series, wherein each of the busbars defines a busbar aperture sized substantially equal to one of the ladder apertures.

2. The assembly of claim 1, wherein at least one of the laddered carriers comprises a terminal post having a square-shaped face and conductively connected to at least one of the first and second groupings of spaced apart busbars, and wherein the terminal post is configured to electrically connect with another array of pouch battery cells.

3. The assembly of claim 2, wherein the array comprises an odd number of pouch battery cells, and wherein each of the pair of laddered carriers comprises a terminal post at opposite ends of the array configured to electrically connect the array to another array of pouch battery cells.

4. The assembly of claim 2, wherein the array comprises an even number of pouch battery cells, and wherein one of the pair of laddered carriers comprises two terminal posts at opposite ends of the array to electrically connect the array to another array of pouch battery cells.

5. The assembly of claim 1, wherein clusters of adjacent pouch battery cells are arranged in parallel, and wherein the first and second groupings of spaced apart busbars are arranged with the terminal tabs of the clusters to electrically connect the clusters in series.

6. The assembly of claim 1, further comprising one or more sense wires electrically connected with the pouch battery cells and configured to measure temperature, voltage, or current conditions of the array.

7. The assembly of claim 1, wherein each of the busbars is electrically connected to at least two terminal tabs of opposite polarity or a terminal post.

8. A vehicle comprising:
   an array of pouch battery cells each having terminal tabs of opposite polarity extending from opposing cell faces;
   a tray supporting the cells;
   a pair of carriers extending along the cell faces, each defining a plurality of apertures sized to receive the terminal tabs, and oriented perpendicularly relative to the tray; and
   a plurality of busbars arranged with the carriers and terminal tabs for parallel and series connection, wherein each of the busbars defines a busbar aperture sized substantially equal to one of the apertures in the carriers.

9. The vehicle of claim 8, wherein the pouch battery cells are arranged in clusters of adjacent cells connected in parallel, and wherein the busbars are arranged in spaced apart groups on each of the carriers and joined to adjacent terminal tabs to connect the clusters in series.

10. The vehicle of claim 9, wherein one of the pair of carriers includes a terminal post at either end of the carrier conductively connected to the clusters of adjacent cells and configured to conductively connect to another array of battery cells.

11. The vehicle of claim 9, wherein each of the carriers includes a terminal post at opposite ends of the array conductively connected to the clusters of adjacent cells and configured to conductively connect to another array of battery cells.

12. The vehicle of claim 8, wherein each of the busbars defines a tab aperture to receive the terminal tab, and wherein the tab aperture is in registration with one of the apertures of the respective carrier.

13. The vehicle of claim 8, wherein the pair of carriers is further arranged with the terminal tabs to provide clearance for laser welding of adjacent terminal tabs and busbars.

14. A traction battery assembly comprising:
   a pouch battery cell array having terminal tabs extending from opposite side faces of the cells;
   a pair of laddered carriers along opposite array sides including tab receiving apertures; and
   busbars secured to the carriers in an offset configuration relative to one another electrically connecting parallel clusters of the cells in series, wherein each of the busbars defines a busbar aperture sized substantially equal to one of the carrier apertures.

15. The assembly of claim 14, wherein the pair of laddered carriers each includes a terminal post conductively connected to the busbars and configured to electrically connect to another array of pouch battery cells.

16. The assembly of claim 14, wherein one of the pair of laddered carriers includes a terminal post conductively connected to the busbars and configured to electrically connect to another array of pouch battery cells.

17. The assembly of claim 14, further comprising one or more sense wires electrically connected with the pouch battery cells and configured to measure temperature, voltage, and current conditions of the array.

18. The assembly of claim 14, further comprising a pair of endplates secured to the carriers at opposite ends of the array, wherein the endplates and carriers are configured to be secured to a support structure of another array.

* * * * *